Sept. 4, 1962  W. A. KUHAR ET AL  3,052,768
PLUG-IN CONTACT DEVICE
Filed Aug. 25, 1960  6 Sheets-Sheet 1

INVENTORS
WILLIAM A. KUHAR
ELMER T. CARLSON
BY
ATTORNEYS

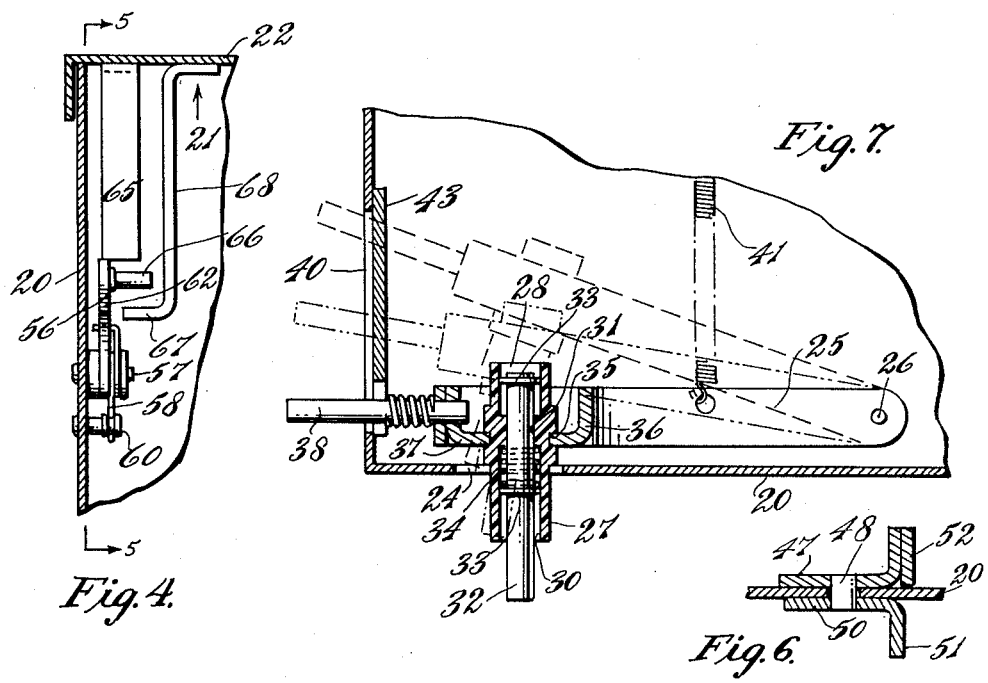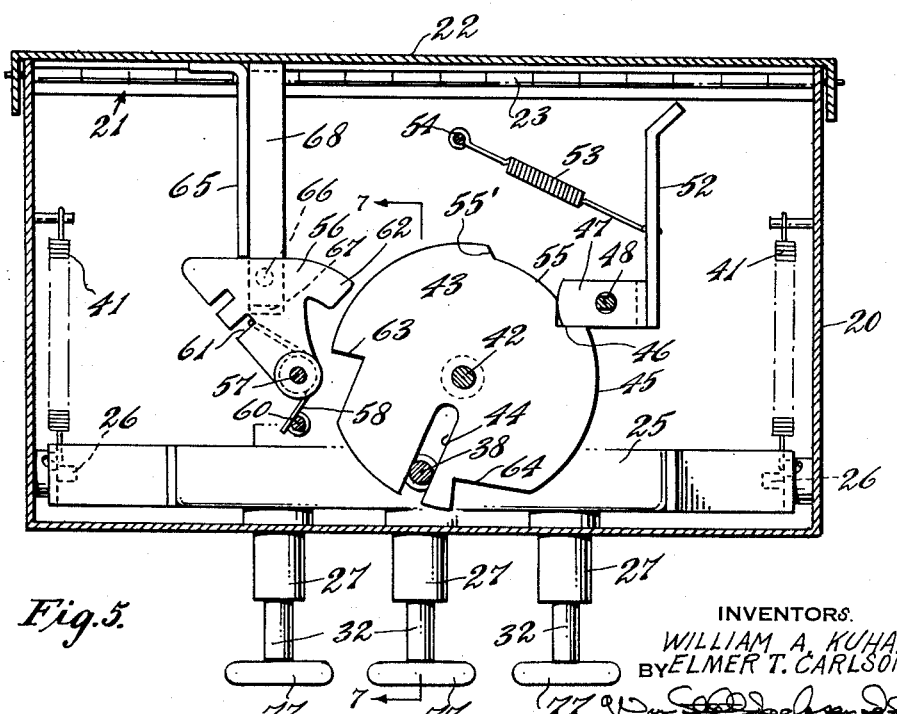

INVENTORS
WILLIAM A. KUHAR
BY ELMER T. CARLSON
ATTORNEYS

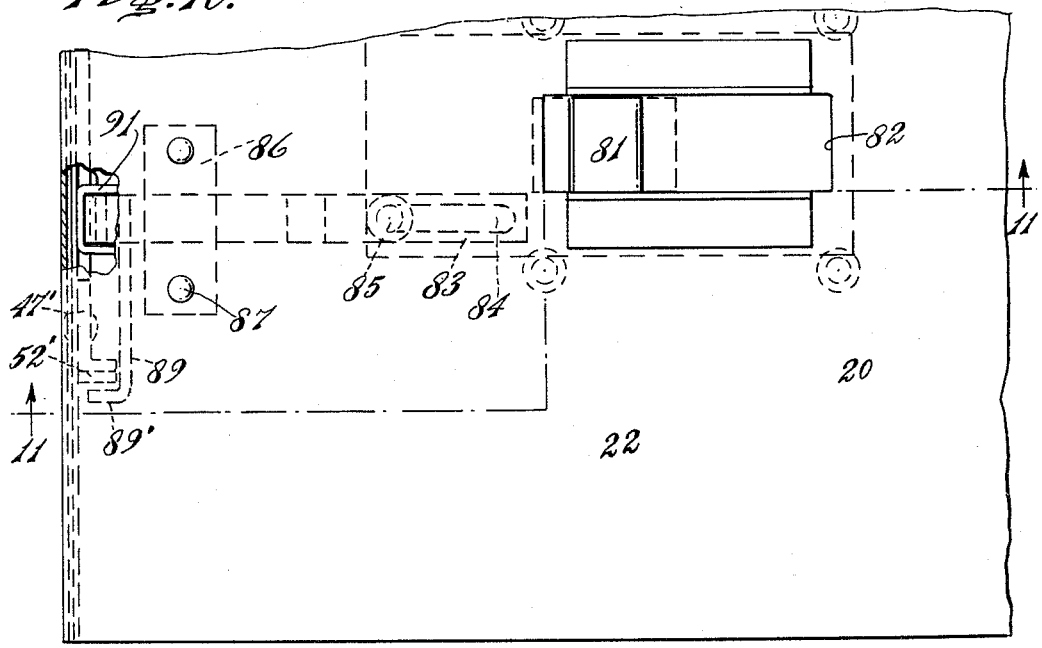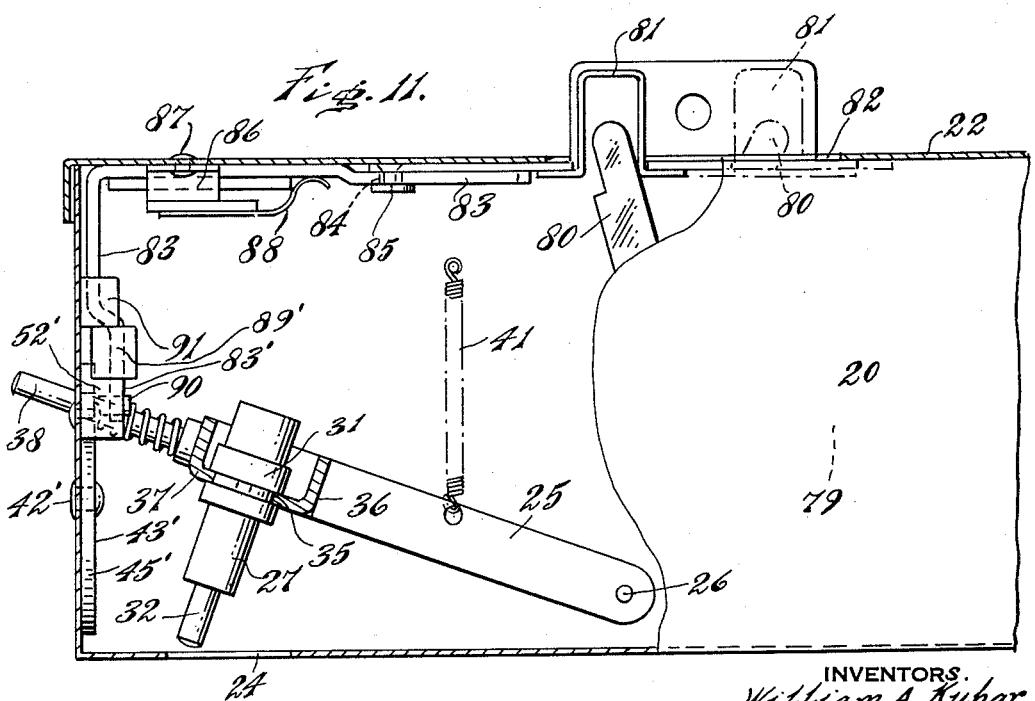

Sept. 4, 1962 W. A. KUHAR ET AL 3,052,768
PLUG-IN CONTACT DEVICE
Filed Aug. 25, 1960 6 Sheets-Sheet 5
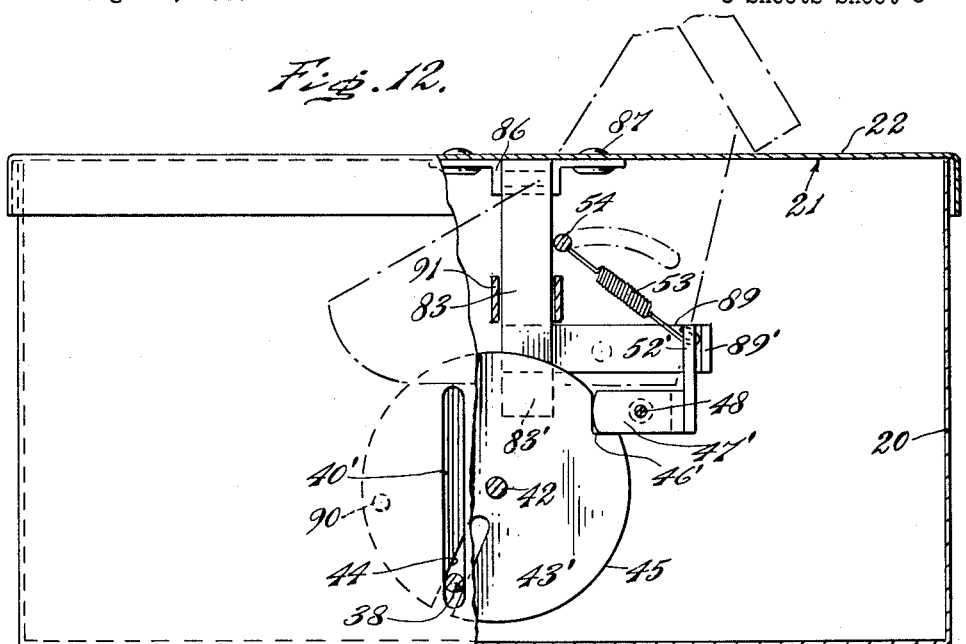
Fig. 12.
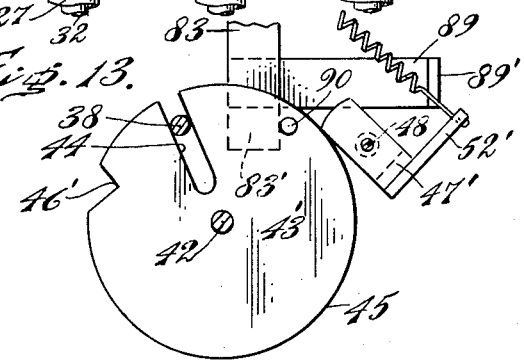
Fig. 13.
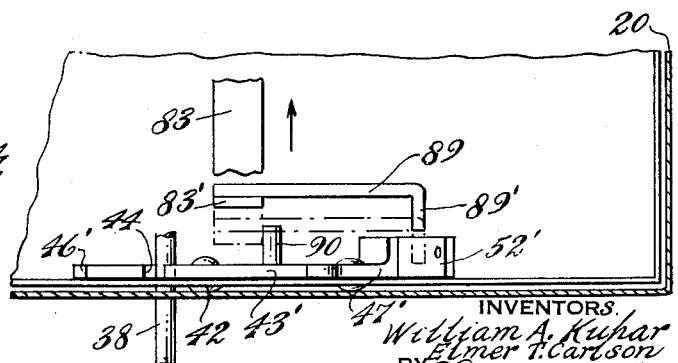
Fig. 14.
INVENTORS.
William A. Kuhar
Elmer T. Carlson
BY
ATTORNEYS Sept. 4, 1962  W. A. KUHAR ET AL  3,052,768
PLUG-IN CONTACT DEVICE
Filed Aug. 25, 1960  6 Sheets-Sheet 6

INVENTORS
William A. Kuhar
Elmer T. Carlson
BY
ATTORNEYS

United States Patent Office 3,052,768
Patented Sept. 4, 1962

3,052,768
PLUG-IN CONTACT DEVICE
William A. Kuhar, Bethlehem, and Elmer T. Carlson, Center Valley, Pa., assignors, by mesne assignments, to Uni-Bus, Inc., Allentown, Pa., a corporation of Delaware
Filed Aug. 25, 1960, Ser. No. 51,967
18 Claims. (Cl. 200—50)

The present invention relates to contact devices particularly of the type which are intended to plug into a bus duct for connecting to electrical equipment along the bus duct and also relates to plug-in connection of circuit breakers, motor starters, and other electrical equipment in control centers, switchboards, and the like.

A purpose of the invention is to make a more simple, small, reliable and less expensive device for plug-in contact to busways.

A further purpose is to permit the complete latching and interlock functions in connection with the plug-in devices to be performed by a single cam.

A further purpose is to operate the contact carriage by an operating lever which extends through the plug-in housing, and to provide follower connection between the plug-in lever and the cam so that the linear motion of the plug-in lever will produce rotation of the cam, and latching under various conditions may be employed on the cam.

A further purpose is to interlock the cover and also desirably auxiliary equipment such as circuit breakers and switches by means of the cam.

A further purpose is to trip a latch on a bus duct contact device by remote control means, suitably solenoid operated.

A further purpose is to prevent the entry of dust into the plug-in device by a shutter which closes a slot where the operating lever passes through a slot in a cam.

Further purposes appear in the specification and in the claims.

In the drawings we have chosen to illustrate a few only of the numerous embodiments in which the invention may appear, selecting the form shown from the standpoints of convenience in illustration, satisfactory operation and clear demonstration of the principles involved.

FIGURE 4 is an enlarged fragmentary section of FIGURE 1 on the line 4—4.

FIGURE 5 is a section of FIGURE 4 on the line 5—5, showing the contacts fully advanced or closed.

FIGURE 6 is an enlarged fragmentary section of FIGURE 1 on the line 6—6.

FIGURE 7 is a fragmentary section of FIGURE 5 on the line 7—7.

FIGURE 10 is a fragmentary plan view of a modified form of plug-in device according to the invention.

FIGURE 11 is a side elevation of the device of FIGURE 10 partially sectioned on the line 11—11.

FIGURE 12 is an end elevation of the device of FIGURES 10 and 11, partially broken away to show the interior construction. This view shows the carriage advanced and the contacts closed.

FIGURE 13 is a fragmentary view similar to FIGURE 12 showing the cam and the latch and interlock for the position in which the carriage is retracted and the contacts open.

FIGURE 14 is a fragmentary top plan view of FIGURE 13 showing the interlock retracted in solid lines and advanced in dot-and-dash lines.

Figure 1:
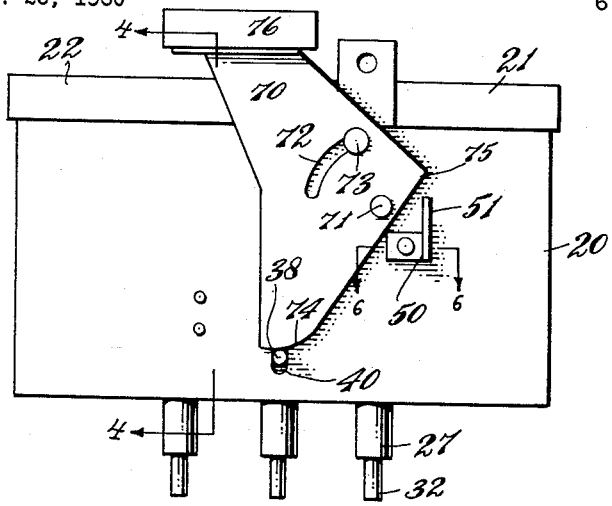
FIGURE 1 is an end elevation of a plug-in device of the invention, with the contacts advanced.

Describing in illustration but not in limitation and referring to the drawings:

In the prior art relatively complicated mechanism has been required to control the operation of plug-in contacts in plug-in devices of the type which connect to the conductors of a busway or bus duct, either for the purpose of connecting to branch lines and separate items of electric equipment, or for the purpose of providing plug-in for motor controls, circuit breakers and the like. The invention is useful not only where the conductors are in the same circuit but also where the conductors are in different circuits, as where some are the main circuit and some are in a control circuit. Miniaturization of the device is made possible by the invention.

By the device of the invention, the mechanism is being greatly simplified, so that it is possible to accomplish all of the latching and interlocking by means of a single cam.

For this purpose the contact carriage is provided with an operating lever, which has a follower connection to a cam, the cam in turn providing the basis for latching and interlocking.

In many cases it is desirable to prevent dust from entering the plug-in device, and for this purpose a shutter is provided over the cam slot in the preferred embodiment.

It is also desirable in some instances to release the plug-in device by remote control, and this is illustrated in a variation.

Considering first the form of FIGURES 1 to 9 inclusive, we illustrate a boxlike suitably metallic housing 20 having a front or top opening 21 which is closed by a suitably metallic cover 22 pivotally or hingedly connected with the housing at 23.

At the side remote from the cover near one end, there is a contact opening 24 through which the contacts extend to interconnect with the conductors of the busway or bus duct.

Inside the housing there is provided a suitably metallic carriage 25 which is pivotally connected at its rear end at 26 to the housing and has a retracted, an intermediate and an advance position as best seen in FIGURE 7.

The carriage at its forward end mounts a plurality of tubular insulators 27, of which three are shown in the particular device, and each of the insulators has opposed bores 28 and 30 with an intermediate tubular shoulder 31 at the inside. The tubular shoulder guides metallic contacts 32 which are provided with spaced locking rings 33 on opposite sides of the shoulder and are spring-urged toward advanced position between the shoulder 31 and the most advanced locking ring 33 by a helical compression spring 34. Thus the contacts 32 can yield for overtravel of the carriage. Pigtails not shown connect to the contacts.

The insulators are held in place at a recessed portion 35 by separable carriage portions 36 and 37 which are secured together as by welding to hold the insulators.

Fastened at the end of the carriage remote from the pivot and protruding therefrom transverse to the pivot is an operating rod or lever 38 which extends through a slot 40 in the housing. The operating rod or lever may itself be engaged to manipulate the carriage, since it is accessible outside the housing, but it will preferably be manipulated as later explained by means of a handle.

The carriage is continuously urged toward retracted position by helical tension springs 41 acting from suitable abutments on the housing, to the carriage.

Pivoted on an axis 42 transverse to the pivot axis of the carriage and suitably located on the inside of the housing is a cam 43 which has a radial follower slot 44 through which the operating lever passes so that movement of the operating lever up and down rotates the cam, the operating lever being at one side of the pivot 42.

The cam has a generally uniform outside circular portion 45 which is interrupted by latching notch 46 which is used to hold the contacts fully advanced into closed position in engagement with the conductors 77 of the busway or bus duct. For this purpose latching means are used, consisting of a latch 47 which is suitably keyed on a squared portion of a pivot shaft 48, which shaft is pivoted on and passes through the housing and at the outside has keyed thereon a latch release element 50 having a release abutment 51 to be described.

The latch 47 has a latch lever 52 inside the housing which permits ready access for manual release, and which acts as an abutment for helical tension spring 53 which urges the latch toward spring anchorage 54 on the housing.

When the carriage is advanced as shown in FIGURE 5, the latch 47 engages the latching recess 46 of the cam and holds the carriage in closed contact position against the pull of carriage springs 41. When latch 47 releases, there is a radial inner portion 55 of the cam encountered by the latch and then a latching notch 55' which engages the latch 47 to hold the carriage and the contacts in intermediate position so that any arcing which might occur on opening the contacts will terminate before the contacts retract within the housing, thus guarding against arcing to ground on the housing.

Suitably on the opposite side of the cam from the latch 47 is an interlock latch 56 pivoted at 57 on the housing and urged toward the cam by torsion spring 58, which at one end engages spring abutment 60 on the housing and at the other end after wrapping around the pivot 57 engages in notch 61 the interlock latch.

Figure 8:
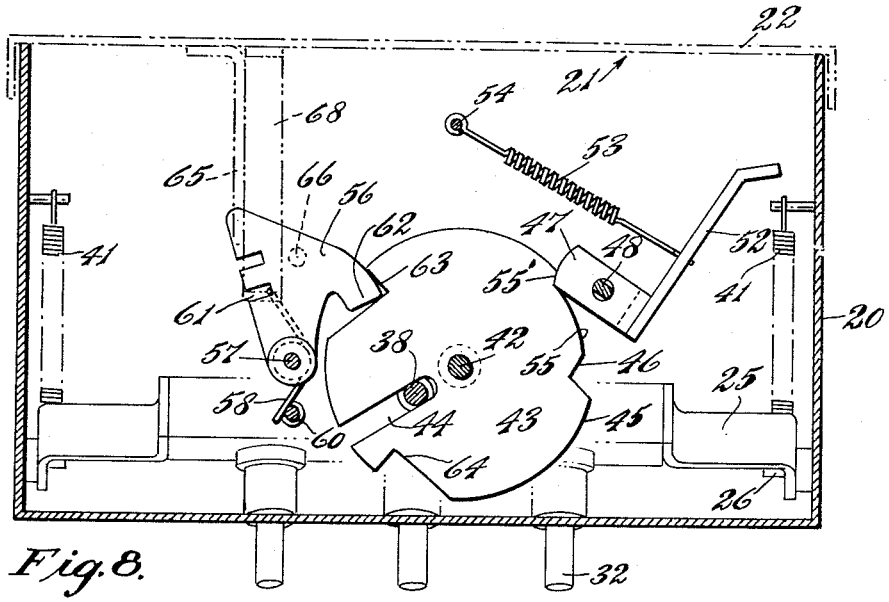
FIGURE 8 is a view corresponding to FIGURE 5 but showing the contacts in intermediate or partially retracted position.
Figure 9:
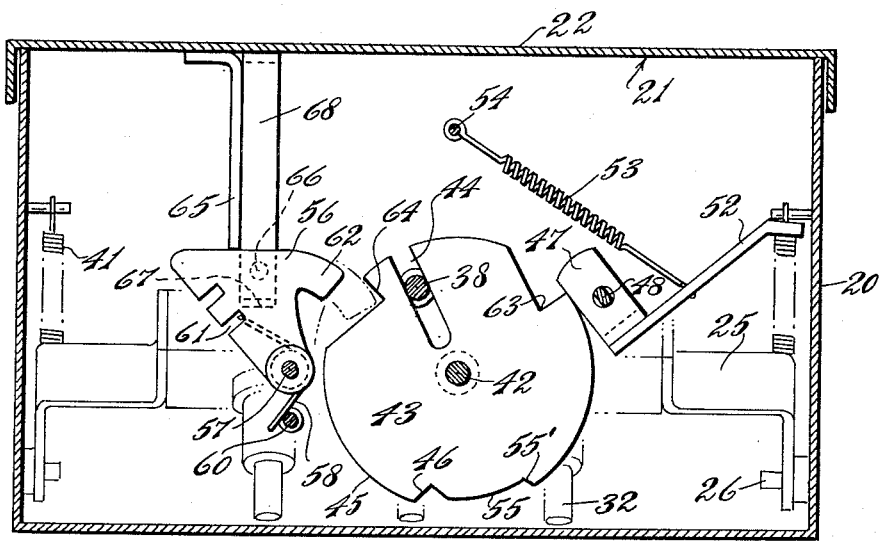
FIGURE 9 is a view corresponding to FIGURE 5 but showing the contacts fully retracted or open.

In the intermediate position of the contacts, if the cover 22 is open, latching dog 62 on interlock latch 56 engages in latching recess 63 of the cam as shown in FIGURE 8. In fully open position of the contacts, if the cover is open, latching dog 62 is able to engage in recess 64 of the cam as shown in FIGURE 9 and as suggested by the dot-and-dash lines. The cover 22 has secured thereto an abutment 65 on the side remote from the pivot 57 with respect to the cam 43, which, as shown in FIGURES 5 and 9, acts on the interlock latch 56 and pushes it out of engagement with the cam 43 and in so doing brings pin 66 on the interlock into a position where it is in the path of hook end 67 of interlock 68 attached to the cover 22, so that when the interlock latch is in the position of FIGURES 5 and 9, the cover 22 cannot be opened.

As long as the interlock latch 56 has the dog 62 opposite a circular portion of the outside of the cam 43 the interlock latch must stay in the general position of FIGURE 5.

On the outside of the housing there is a handle 70 pivoted on the housing at 71 and having an arcuate slot 72 which receives a headed limiter rivet 73 which supports the handle. The handle has a lower toe portion 74 which is suitably curved to conveniently act on and force the operating handle 38 forward, and also has a heel 75 portion, which, when the handle moves from the position of FIGURE 1 to the position of FIGURE 2, acts on the latch abutment 51 to release the latch 47 from the position of FIGURE 5 in which the contacts 32 are closed, to the position of FIGURE 8 in which the contacts are partially open, and arcing at the contacts can be overcome if any occurs.

The handle has an operating grip 76 which can be engaged by the operator by hand or with a pole or the like.

When the operating lever moves from the fully open position to the fully closed position the cam 43 turns through an angle of about 150°.

In operation of the form of FIGURES 1 to 9, the contacts are closed to engage bus duct conductors 77 as shown in FIGURE 5, by moving the handle 70 to the position of FIGURE 1, during which action follower slot 44 forces the operating lever 38 in the direction of closing, and latch 47 engages latching release 46 of the cam. This action cannot take place unless the cover is closed and interlock abutment 65 brings interlock latch 56 into the position of FIGURE 5 so that the latching dog 62 is not in either latching recess 64 of the cam or latching recess 63 as shown in FIGURES 9 and 8. In order for the contacts to move to closed position also pin 66 of the interlock latch is in the path of hook end 67 of interlock 68 so that the cover cannot be opened.

There is overtravel provision by compression of springs 34 around the contacts.

Figure 2:
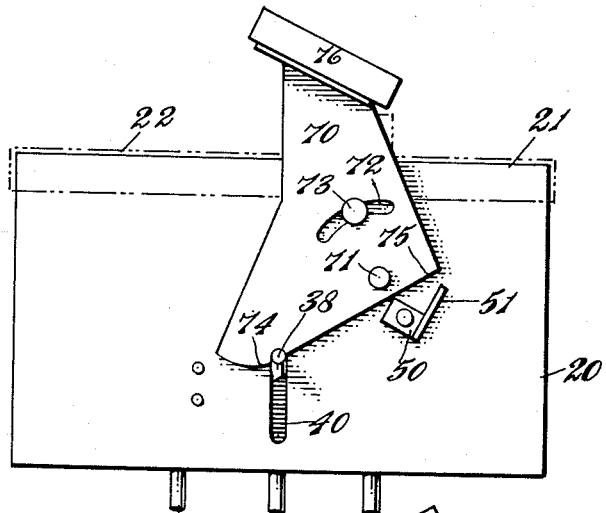
FIGURE 2 is a view corresponding to FIGURE 1 showing the contacts in intermediate position or partially retracted.
Figure 3:
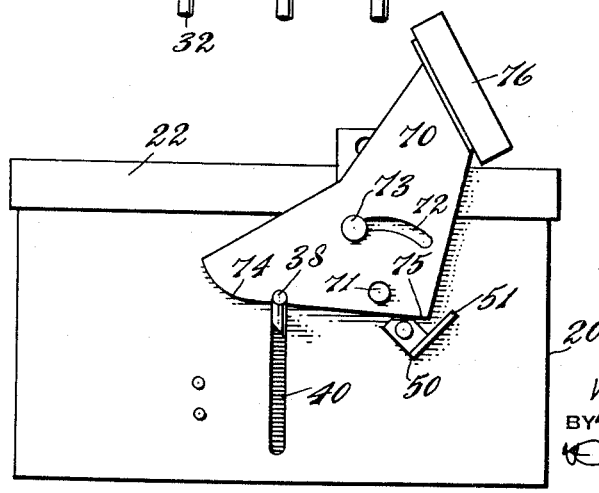
FIGURE 3 is a view similar to FIGURES 1 and 2 but showing the contacts retracted.

In order to open the contacts 32, if provision has been made to permit arcing from the bus conductors as by providing silver contact areas on the bus conductors, this is accomplished by moving the handle 70 to a position of FIGURE 2 so that latching abutment 51 is deflected by heel 75 and deflects latching shaft 48 and latch 47 so that the latch against the action of spring 53 rides along cam surface 55 and then engages cam recess 55' as shown in FIGURE 8, holding the contacts 32 partially open so that arcing can terminate and there will be no tendency to arc to ground on the housing. It is now not possible for the operator to further open the contacts by means of the handle 70 since the cam 43 cannot turn further toward opening position because of the action of the latch 47 at cam recess 55' (FIGURE 8).

In this position of FIGURE 8, however, the torsion spring 58 has moved the interlock latch 56 as shown, to enter cam recess 63 so that the pin 66 is no longer in line with the hook end 67 of the interlock abutment 68. The operator can now raise the cover and reach inside and move latch 47 by lever 52 to the position of FIGURE 9, and thus the cam 43 under the pressure of the carriage springs 41 turns to the position of FIGURE 9 and the carriage and contacts fully retract. While the cover 22 is open the interlock latch reaches the position shown in dot-and-dash lines in FIGURE 9 but when the cover 22 is again closed the interlock latch 56 returns to the position of FIGURE 9, locking the cover. If, however, it is desired to raise the cover again while the cam is in the position of FIGURE 9 this can be accomplished because there is sufficient play before the pin 66 engages the hook end 67 to permit the interlock latch to swing until the pin 66 is out of the path of the interlock hook 67. While the cover is raising the abutment 65 is retracted.

In some cases it is desirable to interlock the carriage 22 and the cam 43 with another piece of mechanism, suitably a circuit breaker or auxiliary switch, as shown in the form of FIGURES 10 to 14. In this case the auxiliary switch or circuit breaker is in the housing 79 and has an operating handle 80 (FIGURE 11) which is surrounded by a sliding handle 81 in the cover provided with a cover slot 82 through which the sliding handle can move. The sliding handle is interconnected to an interlock slide 83 which is slotted at 84 and guided by guide rivet 85, and also guided by guide bracket 86 fastened to the cover by rivets 87 and carrying leaf spring 88 which engages and presses the interlock slide against the inside of the cover. The interlock slide 83 has an arm 89 which extends generally parallel to the cam 43' and has a hook end 89', so that, when the interlock slide is moved to the position corresponding with the opening of the switch or circuit breaker by handle 80, the hook end 89' is out of the way, but when the interlock slide is moved to the position where the switch or circuit breaker is closed, the hook end 89' engages lever portion 52' of latch 47', which, with the contacts closed as in FIGURE 1, is in cam recess 46'. Therefore the hook end 89' prevents the latch from unlatching and allowing the contacts to open unless the auxiliary circuit breaker or switch is open. Thus the contacts 32 cannot open under load.

On the other hand, if the primary contacts 32 are open and the auxiliary switch or circuit breaker 79 is closed as indicated by the position of operating handle 80, the abutment 83' of the interlock moves into the path of pin 90 of the cam 43' so that it is not possible to move the cam to the position for closing the primary contacts under load. In order therefore to close the primary contacts it is necessary to move the secondary switch or circuit breaker 79 to open position by handle 80.

In operation of the form of FIGURES 10 to 14 therefore, it will be evident that the auxiliary switch or circuit breaker must be shifted to open position and must bring its interlock into the corresponding open position in order to either open or close the primary contacts.

In the form of FIGURES 10 to 14 no provision has been made for latching action on the cam to prevent the primary contact from fully opening in one step, because the opening of the auxiliary switch or circuit breaker takes care of preventing any arcing during opening of the primary contacts.

In the form of FIGURES 10 to 12, when the interlock is in position to lock it extends between U side portions 91 anchored to the side of the housing and this prevents the cover 22 from opening by laterally restraining the cover.

It will be evident of course that if desired means can be provided other than opening the housing cover to manipulate the latch in the form of FIGURES 1 to 9, as for example by provision of a screw driver slot on the latch shaft 48.

Figure 15:
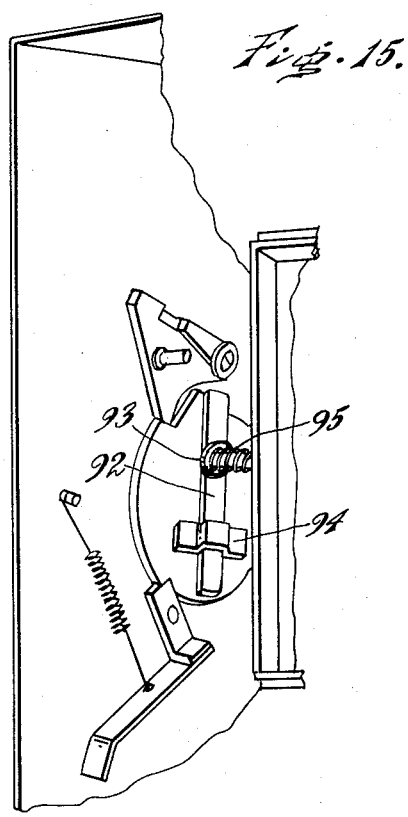
FIGURE 15 is a view similar to a fragment of FIGURE 5 showing a shutter closing the slot in the cam in a variation of the invention.

FIGURE 15 shows a modification of the device of the invention in which the slot 44 in the cam is closed by a shutter 92 which has an opening 93 through which the operating handle 38 passes, and which is retained in position by a guide 94 on the cam and a helical compression spring 95 surrounding the operating lever. The shutter excludes dust and prevents the possibility of foreign objects such as wires entering the plug-in device unintentionally.

Figure 16:
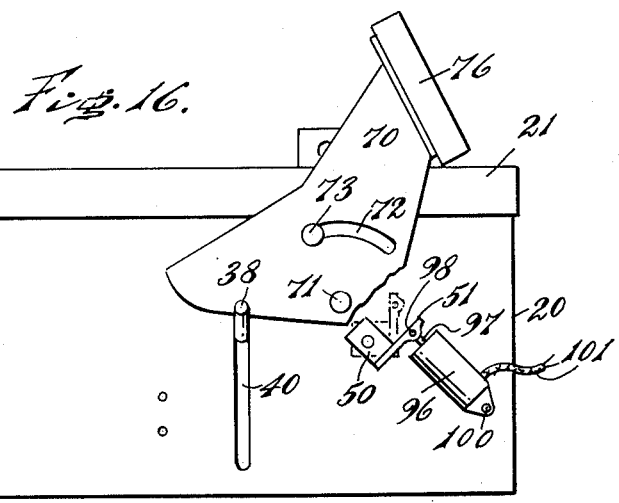
FIGURE 16 is an end elevation similar to FIGURE 3 but partially broken away, showing a variation in which a solenoid operates the latch release element 50.

It is desirable in some cases as shown in FIGURE 16 to operate the latch release by remote control means, suitably from a solenoid. This may function in one of several different ways.

We illustrate in FIGURE 16 a solenoid 96 having an armature 97 pivotally connected to the latch arm 51 at 98. The solenoid itself is pivoted to the housing at 100. The solenoid may be of course provided either outside or inside the box which contains the plug-in device.

By use of the solenoid 96 remote manual or automatic interruption of the circuit can be accomplished. This has several different advantages from the standpoint of safety.

An ordinary motor circuit switch provides a means of opening a circuit under load in the event of failure of a motor controller to open a circuit due to malfunction of the contacts.

In a bus duct system, the plug-in device is normally accomplished as a motor circuit switch. In a motor control center or a distribution panel board the combination branch circuit motor circuit switch is acceptable even though it is remotely located from the motor system. In a bus duct system in a usual factory the motor circuit plug-in devices are generally elevated beyond the reach of workmen on the floor and difficult to operate and difficult to associate with a motor starter which is usually placed near a machine tool at a floor location.

The remote operation by solenoid 96 may be accomplished by locating a control switch for the circuit of solenoid wiring 101 adjacent to the motor starter so that in an emergency a machine operator can promptly accomplish circuit disconnection without the necessity of delaying to locate and reach the motor circuit disconnect. This same benefit can be obtained where disconnect switches are clustered in a central location in a motor control center and are difficult to reach.

Motor starters are commonly provided with means for opening the starter line contacts if load currents exceed a predetermined value. There is a possibility that the line contacts of the motor starter may become welded together on excessive overloads. When this happens it is necessary for a human operator by his senses to determine the presence of smoke, fire or other abnormal operating conditions. This may be a hazard to life and property before the dangerous conditions are recognized. By placing the wiring 101 of solenoid 96 in the overload circuit of the overload relay of the motor starter, automatic operation to disconnect the plug-in device is accomplished so that in the event of an overload on the motor starter, regardless of the position of the motor starter contacts, the motor circuit is effectively interrupted by the device of the present invention.

This feature also has an advantage in that it requires an experienced electrician to restore service and does not permit a relatively inexperienced machine operator to do so.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a contact device, a housing having openings through which contacts are adapted to extend, a movable carriage within the housing and pivoted on the housing, insulating means mounted on said carriage, contact means secured to the insulating means and adapted in forward position of the carriage to extend through the opening in the housing, an operating lever extending from the carriage remote from the carriage pivot, spring means biasing the carriage toward one limiting position, a cam pivoted on the shousing on an axis transverse to the carriage axis, said cam having a follower slot through which the operating lever extends, the cam being turned by the operating lever as the carriage moves up and down, said cam having a latching recess, and latch means which in one position of the cam engages in the latching recess.

2. A contact device of claim 1, in combination with a cover pivotally connected to the housing, and interlock means interengaging between the cover and the latch means for releasing the latch means when the cover is closed.

3. A contact device of claim 1, in combination with a cover pivotally connected to the housing and an interlock interengaging between the latch means and the cover for locking the cover closed when the latch means is not engaged in the latching recess of the cam.

4. A contact device of claim 1, in combination with a cover pivoted to the housing and interlock means operating between the cover and the latch means for releasing the latch means when the cover is closed and for interlocking the cover to the latch means so that the cover cannot be opened when the latch means is in released position.

5. A contact device of claim 1, having two latch means, one of which cooperates with said cam to hold said cam latched with the carriage fully advanced, and the other of which cooperates with said cam to hold said cam latched when the carriage is partially retracted.

6. A contact device of claim 1, having first latch means cooperating with the cam to lock the cam when the carriage is fully advanced and manually operable to release the cam and then again cooperating with the cam to prevent the carriage from retracting beyond an intermediate position, and second latch means having a release position cooperating with the cam when the carriage is in intermediate position, in combination with a cover pivoted on the housing and interlock means from the cover for moving the second latch means out of engagement with the cam when the cover is closed, said interlock means interengaging with said second latch means when it is moved to interlock position.

7. A contact device of claim 6, in combination with a latching recess in the cam in retracted position of the carriage which cooperates with the second latch means to latch the cam when the cover is open and the interlock means fails to retract said second latch means.

8. A device of claim 1, in combination with a cover hingedly connected to the housing, and interlock means on the cover which holds the latch means into engagement with the cam at a position at which the carriage is advanced, and which permits the latch means to move to a position at which the carriage retracts when said interlock means itself is retracted.

9. A contact device of claim 1, in combination with a cover pivotally connected to the housing and interlock means on the cover which prevents the cam means from turning to advance the carriage in one position of the interlock means and permits the cam means to turn to advance the carriage in another position of the interlock means.

10. A contact device of claim 1, in combination with switch means having an operating handle, a cover pivotally connected to the housing, and interlock means on the cover connected to the operating handle of the switch means and interconnected with the latch means to prevent the latch means from releasing the cam means except when the switch means is open.

11. A contact device of claim 10, in combination with interlock means on the cam, for preventing the carriage from advancing except when the switch means is open.

12. A contact device of claim 1, in combination with a shutter moving with the operating lever across and closing the follower slot.

13. A contact device of claim 1, in combination with solenoid means acting on said latch means to release the contact means.

14. In a contact device, a housing having a contact-making opening and having a cover opening, a movable carriage pivoted on the housing, insulating means mounted on the carriage, contact means secured to the insulating means and adapted to extend through the contact-making opening of the housing when the carriage is advanced, an operating lever extending from the carriage remote from the carriage pivot, there being a slot in the housing through which the operating lever extends to a point outside the housing, handle means outside the housing operatively connected to the operating lever, spring means biasing the carriage toward retraction, a cam pivotally mounted on the housing on an axis transverse to the carriage pivot axis having a follower slot operatively connecting the cam to the operating lever, said operating lever extending through said follower slot, first latch means pivotally mounted on the housing interconnecting with the cam when the carriage is fully advanced to hold the carriage advanced, means on the handle for deflecting the first latch means from the position in which it holds the carriage fully advanced, and means on the cam for engaging the first latch means in an intermediate position of the carriage and preventing further release of the carriage until the first latch means is released.

15. A device of claim 14, in combination with a cover pivotally connected to the housing, interlock latch means which in both intermediate position and in open position of the carriage is adapted to engage in a cam recess when the cover is open, and interlock means between the cover and the interlock latch means, said interlock means deflecting the interlock latch means out of engagement with the cam when the cover is closed, and for interlocking the cover with the interlock latch means and preventing opening of the cover when the cover is closed and the interlock latch is out of engagement with the cam recess.

16. In a contact device, a housing having a cover opening and having a contact opening, a movable carriage pivoted on the housing, insulating means mounted on the carriage, contact means secured to the insulating means and advancing through the contact opening in the carriage when the carriage is forward, an operating lever extending from the carriage remote from the carriage pivot, there being a slot through the housing through which the operating lever extends to a point outside the housing, spring means biasing the carriage toward retracted position, a cam pivotally mounted on the housing on an axis transverse to the axis of pivoting of the carriage and having cam recesses, a follower slot in the cam through which the operating lever extends, a cover pivoted on the housing, interlock latch means adapted to extend into recesses of the cam when the cover is open and the carriage is in retracted position or intermediate position and interlock means holding the interlock latch means out of engagement with the cam when the cover is closed and locking the cover against opening when the interlock latch means is out of engagement with the cam.

17. In a contact device, a housing having a cover opening and having a contact opening, a movable carriage in the housing and pivoted thereon, insulating means mounted on the carriage, contact means secured to the insulating means and in forward position of the carriage extending through the contact opening, an operating lever extending from the carriage remote from the carriage pivot, there being a slot in the housing through which the operating lever extends, spring means biasing the carriage toward retracted position, a switch in the housing having a handle, a cover pivotally connected to the housing and interlock means on the cover between the switch handle and the cam for preventing advancing the carriage when the switch handle is in the position corresponding to closed position of the switch.

18. In a contact device, a housing having a cover opening and having a contact opening, a movable carriage in the housing and pivoted thereon, insulating means mounted on the carriage, contact means secured to the insulating means and in forward position of the carriage extending through the contact opening, an operating lever extending from the carriage remote from the carriage pivot, there being a slot in the housing through which the operating lever extends, spring means biasing the carriage toward retracted position, a switch in the housing having a handle, a cover pivotally connected to the housing, latch means engaging the cam and holding the carriage in advanced position and interlock means between the switch handle and the latch means for preventing release of the latch means in retraction of the carriage when the switch means is closed, and means on said interlock means for locking the cover closed.

References Cited in the file of this patent
UNITED STATES PATENTS
2,902,555     Herrmann _____ Sept. 1, 1959